United States Patent
Bullock et al.

(10) Patent No.: US 6,778,817 B1
(45) Date of Patent: Aug. 17, 2004

(54) METHOD AND SYSTEM FOR COMBINING WIRELESS PHONE JACK AND RF WIRELESS COMMUNICATIONS

(75) Inventors: Scott R. Bullock, South Jordan, UT (US); John M. Knab, Sandy, UT (US)

(73) Assignee: Phonex Corporation, Midvale, UT (US)

( * ) Notice: Subject to any disclaimer, the term of this patent is extended or adjusted under 35 U.S.C. 154(b) by 0 days.

(21) Appl. No.: 09/204,096

(22) Filed: Dec. 1, 1998

(51) Int. Cl.$^7$ ................................................. H04M 9/00
(52) U.S. Cl. ........................ 455/402; 455/462; 455/463; 455/401
(58) Field of Search .......................... 455/62, 401, 402, 455/403, 450, 462, 463

(56) References Cited

U.S. PATENT DOCUMENTS

| | | | |
|---|---|---|---|
| 3,949,172 A | 4/1976 | Brown et al. | ............ 179/2.5 R |
| 4,058,678 A | 11/1977 | Dunn et al. | ............... 179/2.5 R |
| 4,471,399 A | 9/1984 | Udren | .......................... 361/64 |
| 4,475,193 A | 10/1984 | Brown | ........................ 370/124 |
| 4,479,033 A | 10/1984 | Brown et al. | ............... 179/2.51 |
| 4,495,386 A | 1/1985 | Brown et al. | ............... 179/2.51 |
| 4,514,594 A | 4/1985 | Brown et al. | ............... 179/2.51 |
| 4,523,307 A | 6/1985 | Brown et al. | .................. 370/30 |
| 4,558,177 A * | 12/1985 | Corris et al. | .................... 179/2 |
| 4,701,945 A | 10/1987 | Pedigo | ........................ 379/66 |
| 5,066,939 A | 11/1991 | Mansfield, Jr. | ......... 340/310 R |
| 5,225,902 A * | 7/1993 | McMullan, Jr. | ............... 455/62 |
| 5,319,634 A | 6/1994 | Bartholomew et al. | ........ 370/18 |
| 5,530,737 A | 6/1996 | Bartholomew et al. | ........ 379/62 |
| 5,559,804 A | 9/1996 | Amada et al. | ............. 370/95.3 |
| 5,630,204 A | 5/1997 | Hylton et al. | ................. 455/3.3 |
| 5,706,191 A | 1/1998 | Bassett et al. | ............... 364/138 |
| 5,737,400 A | 4/1998 | Bagchi et al. | ............... 375/142 |
| 5,832,364 A * | 11/1998 | Gustafson | ..................... 455/14 |
| 6,032,039 A * | 2/2000 | Kaplan | ....................... 455/413 |
| 6,212,658 B1 * | 4/2001 | Le Van Suu | .................. 455/62 |

\* cited by examiner

*Primary Examiner*—Nay Maung
*Assistant Examiner*—Tanmay LeLe
(74) *Attorney, Agent, or Firm*—Lloyd W. Sadler

(57) ABSTRACT

A system for communicating signals and data without the need for continuous telephone lines is described. This system provides a base unit connected to incoming signals, such as cable, satellite, PCS, cellular, fiber optics, XDSL, ISDN, etc, one or more extension units connected to the users telephone or electronics equipment and a communication link between the base unit and the one or more extension units. The preferred communication link employs a combination of an A/C power line carrier and a wireless RF channel. This system provides for the communication signals from a variety of sources through out a building or office without requiring either dedicated telephone lines or the availability of AC power outlets near the user's telephone extension equipment. This invention, in its preferred embodiments, is specifically adapted to meet the technical requirements of A/C power line communications, while taking advantage of RF communication within buildings or facilities.

5 Claims, 3 Drawing Sheets

METHOD AND SYSTEM FOR COMBINING WIRELESS PHONE JACK AND RF WIRELESS COMMUNICATIONS

BACKGROUND OF THE INVENTION

1. Field of the Invention

This invention relates to electronic communication systems for both data and voice signals. More specifically, the invention relates to the combination of wireless phone jack technology, making use of power lines as a communication channel, and radio frequency (RF) receivers. This combination permits a telephone user to establish a communication channel with a standard telephone extension via the power lines of a building or facility, without requiring the extension telephone to be directly connected to the power line.

2. Description of Related Art

A variety of power line and wireless telephone voice and/or data communication systems have been developed and are used to facilitate communication in locations where there is little or no availability of dedicated telephone/data wires. While these approaches may address some of the problems encountered in power line or wireless communications they typically do not provide the desirable feature of permitting the remote telephone extension to be able to establish and maintain the communication link without being directly connected to either a telephone line or the power line while still taking advantage of the power line channel for enhancing the signal coverage within a building or facility. The following U.S. patent documents are referred to the reader for general background. Each of these patents is hereby incorporated by reference for the material contained therein.

U.S. Pat. No. 3,949,172 describes a telephone extension system that communicates with a conventional subscriber telephone line where the subscriber's line telephone is located, through available AC power wires which carry signals that may be modulations of RF carrier frequencies and which are coupled to the power lines.

U.S. Pat. No. 4,058,678 describes a remote transmitting or receiving device that communicates with a conventional subscriber telephone through available AC power wires which carry signals that may be modulations of RF carrier frequencies and which are coupled to the power wires.

U.S. Pat. No. 4,471,399 describes a communication system for transmitting baseband digital signals on an electrical power line.

U.S. Pat. No. 4,475,193 describes a power line carrier telephone extension system for transmitting electrical signals between the telephone line and an extension telephone over the AC electric power line available at a telephone subscriber's premises.

U.S. Pat. No. 4,479,033 describes a power line telephone extension system for carrying electrical signals between a subscriber's telephone line of a conventional telephone communication system and the subscriber's remote transmit-receive device over the AC electric power wires available to the subscriber.

U.S. Pat. No. 4,495,386 describes a power line telephone extension system for carrying electrical signals between a subscriber's telephone line and the subscriber's remote telephone extension over the AC electric power wires available to the subscriber.

U.S. Pat. No. 4,514,594 describes a power line carrier telephone extension system for transmitting electrical signals between the telephone line and one or more extension telephones over the AC electric power line available at a telephone subscriber's premises.

U.S. Pat. No. 4,523,307 describes a power line carrier telephone extension system for transmitting electrical signals between the telephone line and an extension telephone over the AC electric power line available at a telephone subscriber's premises.

U.S. Pat. No. 4,701,945 describes a carrier current telephone system provided for buildings.

U.S. Pat. No. 5,066,939 describes a power line carrier communication system operating on a conventional three wire power line that uses more than one of the several RF transmission lines that are defined by the three wire power line to improve communication between units of the system.

U.S. Pat. No. 5,319,634 describes a method and system for conducting multiple access simultaneous telephone communications in full duplex either over the power lines of a building or using RF transmission.

U.S. Pat. No. 5,530,737 describes a method and system for conducting secure power line carrier communications in full duplex over the power lines of a building.

U.S. Pat. No. 5,559,804 describes a wireless communication system that includes a plurality of wireless terminals and a base station for periodically generating a fixed-length communication frame composed of an information field.

U.S. Pat. No. 5,630,204 describes a system for method for providing interactive multimedia services to subscriber premises utilizing wireless and power line distribution within the subscriber premise.

U.S. Pat. No. 5,706,191 describes a method for bringing an appliance and/or an electrical or mechanical system of a residence into communication with another, or with a control device within the residence or with an other communication source outside the residence.

U.S. Pat. No. 5,737,400 describes a no-ring access telecommunications system that is connected to a subscriber's telephone line at the demarcation point between the public switched telephone network and the telephone line or at the utility meter site on the subscriber's premises, or at a central office.

SUMMARY OF THE INVENTION

It is desirable to provide a method and system for telephone communication within buildings or facilities that makes use of both power line and RF communication channels. In particular, it is desirable to provide a communications system that provides the means for communicating to an external telephone service, whether wired or wireless, within a building or structure where direct RF signals are often shielded without requiring the addition of dedicated telephone wires.

Wireless and A/C power line communication systems provide many important advantages over wired telephone line systems. This is particularly the case where standard telephone jacks are limited or unavailable, or where multiple devices require communication over the same channel. Many of the advantages are discussed in further detail in the previously cited patent literature.

Accordingly, it is the primary object of this invention to provide a telephone communication system that provides for communication within buildings or other structures using the combination of the AC power line channel and an RF wireless channel.

Another object of this invention is to provide a telephone communication system which provides for communication between a base unit, connected both to a standard telephone jack and to the power line, and an extension unit, not connected to either the power line or a telephone line.

Another object of this invention is to provide a telephone communication system, which provides for communication between a base unit and an extension unit and where the extension unit makes use of a RF wireless channel to communicate with the powerline channel.

A further object of this invention is to provide a telephone communication system for the communication of signals using both A/C power lines and wireless RF signals where error correction is performed to maintain data integrity.

Additional objects, advantages, and other novel features of this invention will be set forth in part in the description that follows and in part will become apparent to those skilled in the art upon examination of the following or may be learned with the practice of the invention. The objects and advantages of this invention may be realized and attained by means of the instrumentalities and combinations particularly pointed out in the appended claims. Still other objects of the present invention will become readily apparent to those skilled in the art from the following description wherein there is shown and described the preferred embodiment of this invention, simply by way of illustration of one of the modes best suited to carry out this invention. As it will be realized, this invention is capable of other different embodiments, and its several details, and specific electronic circuits, are capable of modification in various aspects without departing from the invention. Accordingly, the drawings and descriptions should be regarded as illustrative in nature and not as restrictive.

To achieve the foregoing and other objectives, and in accordance with the purposes of the present invention, a base unit, an extension unit, and, in the preferred embodiment, an A/C power line to RF antenna are provided. The base unit includes a line interface circuit; a signal processor and a data link transceiver. The extension unit includes a transceiver, a signal processor, and preferably an antenna means for communicating with a power line antenna. The preferred embodiment of the invention also has a power line antenna unit, which includes a power line interface, a signal converter and an RF transceiver for communicating with the extension unit.

BRIEF DESCRIPTION OF THE DRAWINGS

The accompanying drawings incorporated in and forming a part of the specification, illustrate a preferred embodiment of the present invention. Some, although not all, alternative embodiments are described in the following description. In the drawings.

Reference will now be made in detail to the present preferred embodiment of the invention, an example of which is illustrated in the accompanying drawings.

DETAILED DESCRIPTION OF THE INVENTION

Figure 1:
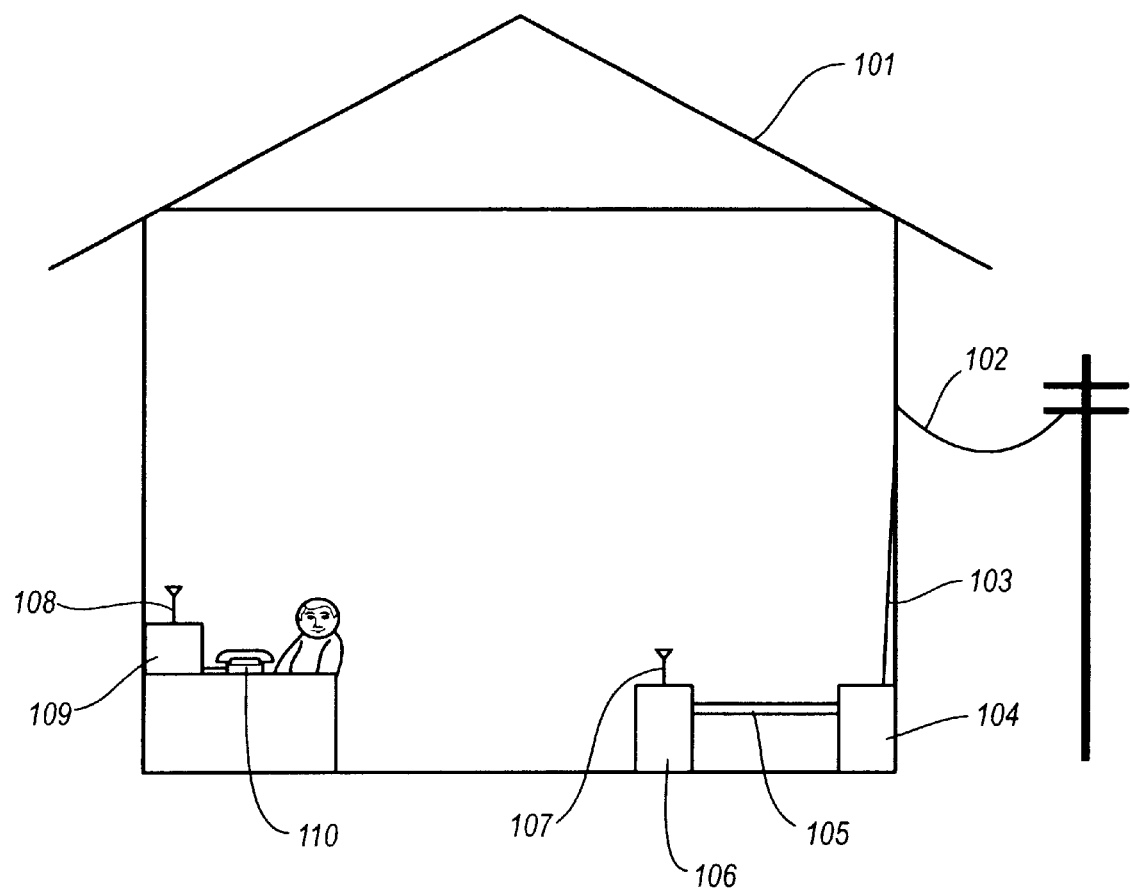
FIG. 1 is a top-level functional diagram showing interaction of the user with the major communication components of the invention.

FIG. 1 shows the top level functional diagram of if the preferred embodiment of the invention. A building or facility 101 is provided with external telephone service 102. Such external telephone service 102 may be a traditional wired service, cable service such as modem and/or internet services, or, alternatively, a wireless RF or satellite service. The external telephone service 102 is received into subscriber telephone lines 103 internal to the building or facility 101. A power line carrier base unit 104 is connected to both the subscriber telephone lines 103 and AC power lines 105 within the building or facility 101. Remote from the base unit 104 but also connected to the AC power line 105 is preferably provided a signal booster unit 106, to which is optionally and preferably connected an RF antenna 107. At a location remote from both the base unit 104 and the signal booster 106 a user has access to telephone equipment 110 which communicates with the base unit 104 via a remote extension unit 109 which preferably has an antenna 108 in communication with the preferred optional antenna 107 connected to the signal booster. In this way telephone communication with in a building or facility 101 is provided to a user who does not have convenient access to either dedicated telephone lines or AC power lines. This invention makes use of both RF and AC power line communication channels for providing voice and/or date communication links.

Figure 2:
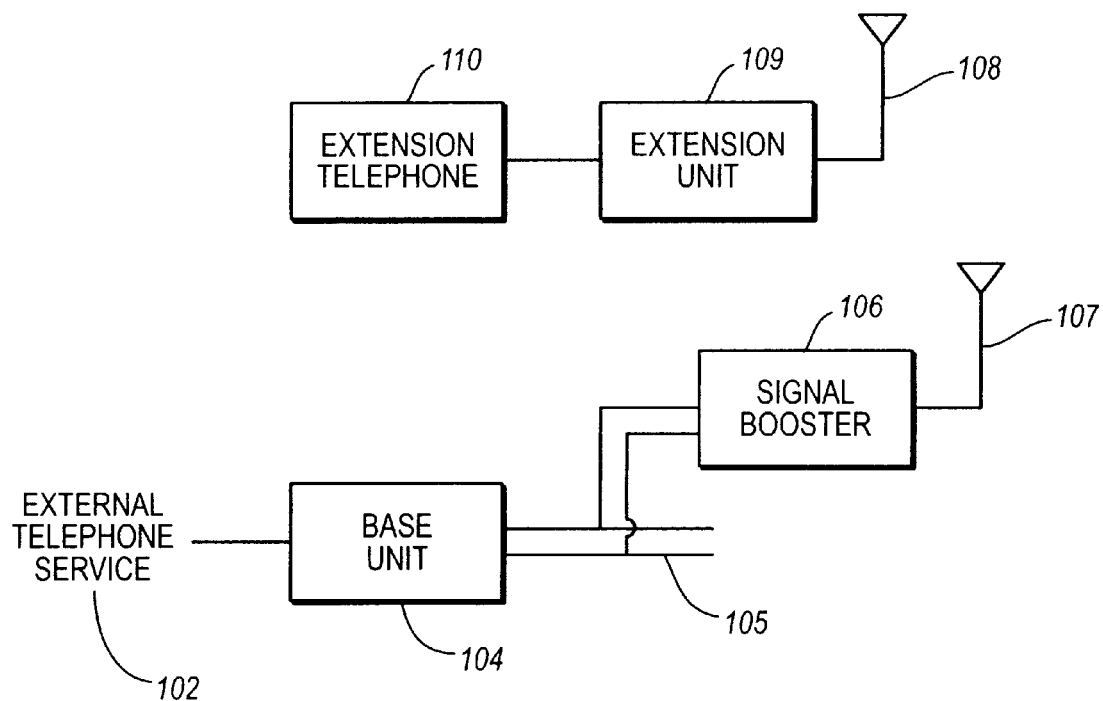
FIG. 2 is a block diagram showing the top-level components of the preferred embodiment of the invention.

FIG. 2 shows a block diagram of the top-level component sections of the preferred embodiment of this invention. The external telephone service 102 is electrically connected to the power line (PLC) base unit 104, which provides the communication interface to the central office (CO). The PLC base unit 104 provides the carrier modulation and power line interface to send and/or receive signals over the power lines 105 in a building or facility 101. The modulated carrier signal is transmitted along the power lines 105. Preferably attached to the power lines 105 typically by a standard AC power plug and outlet, is a signal booster 106, which converts, amplifies and transmits the signal from the base unit 104 and receives the signal from the extension unit 109, preferably using an external RF antenna 107. The transmitted RF signal from the antenna 107 radiates through the air within the building or facility 101, where it is received by an extension antenna 108 and coupled to a remote extension unit 109. The remote extension unit 109 receives the transmitted RF signal and provides an interface to the subscriber's remote telephone extension equipment 110. This interface permits bi-directional communication between the subscriber's remote equipment 110 and the central office. While the signal booster 106 is preferred, in some cases the signal power radiating off the AC power lines 105 is sufficient to provide reliable communication between the power lines 105 and the remote extension unit 109, in these cases the signal booster 106 and attached RF antenna 107 may not be necessary.

Figure 3:
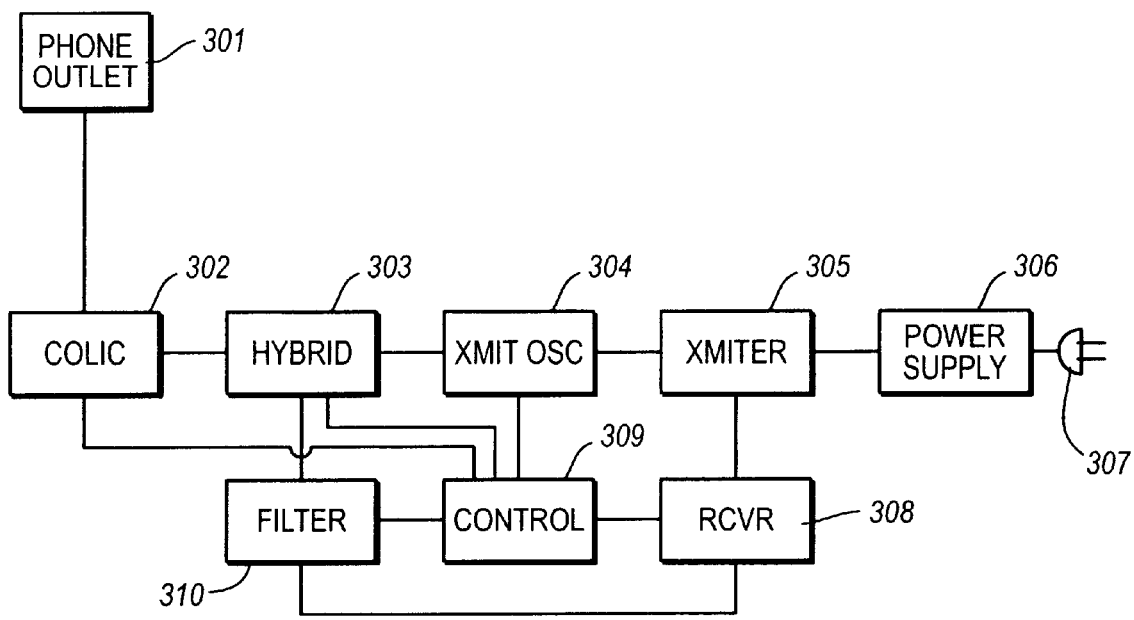
FIG. 3 is a detailed block diagram showing the major component sections of the preferred base unit of the invention.

FIG. 3 provides a detailed block diagram of the major component section of the preferred base unit 104 of the invention. A standard, typically RJ-11, connector for a standard wall telephone outlet 301 electrically connects the base unit 104 to the external telephone service 102. A central office line interface circuit (COLIC) 302 receives the signal from the telephone service 102 and is adapted to send and receive the telephone signals. Electrically attached to the COLIC 302 is a Hybrid circuit 303, which is provided to remove the received signal from the transmitted signal at the two-wire telephone line interface. A transmit oscillator (XMIT OSC) 304 is provided to receive the transmitted signal from the Hybrid circuit 303 and to generate the carrier signal for the transmitter 305. In the preferred embodiment of the invention, the XMIT OSC 304 includes a voltage-controlled oscillator (VCO). The transmitter 305 receives the frequency modulated (FM) signal from the XMIT OSC 304 and sends out the FM signal for transmitting across the power lines 105 via a power supply 306 and, typically, a standard two-prong power plug 307 into a standard AC power outlet. A receiver 308 is provided; preferably electronically connected to the AC power line 105, also via the power outlet 307, the power supply 306 and through the transmitter 305. This receiver 308 receives the power line signals from the extension unit 109. A filter 310, preferably a low pass filter is provided to filter the received signal from the receiver 308. A digital controller 309 is also provided to control the functions of the base unit 104.

Figure 4:
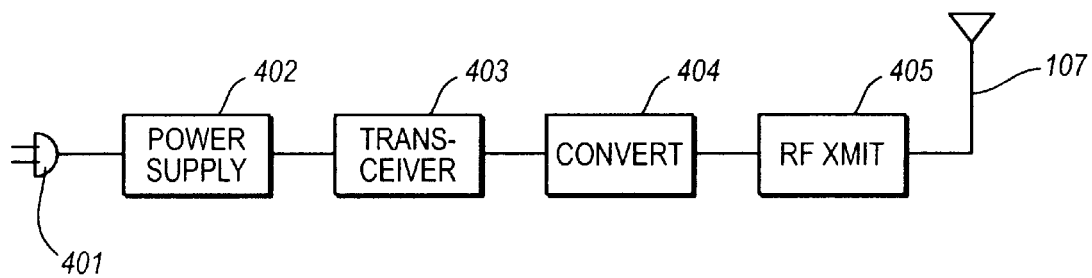
FIG. 4 is a detailed block diagram showing the major component sections of the preferred signal booster component of the invention.

FIG. 4 shows the detailed block diagram of the preferred embodiment of the signal booster 106. A standard AC power plug 401 provides the interface to the AC power line 105. This AC power plug 401 provides both power and communication to a power supply 402. Electrically connected to the power supply 402 is a power line transceiver 403. The power line transceiver 403 is connected to a signal converter 404, which in turn transfers, and receives the communication signals to and from an RF transmitter/receiver 405. The RF transmitter/receiver 405 is electrically connected to an external antenna 107 for providing a communication channel with the extension unit 109.

Figure 5:
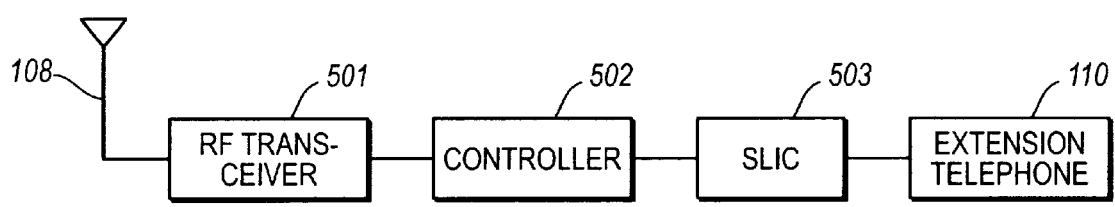
FIG. 5 is a detailed block diagram showing the major component sections of the preferred extension unit of the invention.

FIG. 5 shows a more detailed block diagram of the preferred extension unit 109 where an external antenna 108 providing a communication link between the extension unit 109 and the signal booster 106. The antenna 108 is electrically connected to an RF transceiver 501, which in turn is electrically connected to a controller 502, to control the functions of the extension unit 109. The controller 502 passes the signal to a subscriber line interface circuit (SLIC) 503, which interfaces between the extension unit 109 and the extension telephone equipment 110.

The foregoing description is of a preferred embodiment of the invention and has been presented for the purposes of illustration and as a description of the best mode of the invention currently known to the inventors. It is not intended to be exhaustive or to limit the invention to the precise form, connections, or choice of components disclosed. Obvious modifications or variations are possible and foreseeable in light of the above teachings. This embodiment of the invention was chosen and described to provide the best illustration of the principles of the invention and its practical application to thereby enable on of ordinary skill in the art to utilize the invention in various embodiments and with various modifications as are suited to the particular use contemplated. All such modifications and variations are within the scope of the invention as determined by the appended claims when they are interpreted in accordance with the breadth to which they are fairly, legally and equitably entitled.

We claim:

1. A system for the communication of signals and data, comprising:

(A) a base unit connected to an external telephone service, wherein said base unit is connected to an AC power line for communications;

(B) an extension unit connected to a users extension telephone equipment;

(C) a communication link connecting said base unit to said extension unit, wherein said communication link uses both power line carrier and RF channels;

(D) a signal booster electrically connected to said AC power line for communication with said base unit, wherein said signal booster further comprises a power supply adapted for direct connection with an AC power line for communication of telephone data from said base unit; a transceiver electrically connected to said power supply; a signal converter connected to said transceiver; and an RF transmitter/receiver in communication with said signal converter;

(E) an RF antenna in electronic communication with said signal booster for transmitting and receiving an RF signal through the air; and (F) an extension antenna electrically coupled to said extension unit for transmitting and receiving said RF signal through the air.

2. A system for the communication of signals and data, as recited in claim 1, wherein said base unit further comprises a line interface adapted to send and receive signals from a variety of telephone service connections.

3. A system for the communication of signals and data, as recited in claim 1, wherein said base unit further comprises an AC power line interface.

4. A system for the communication of signals and data, as recited in claim 1, wherein said extension unit is provided with an RF interface.

5. A system for the communication of signals and data, as recited in claim 1, wherein said communication link further comprises an AC power line channel which radiates RF signals for receipt by said extension unit.

* * * * *